United States Patent
Scott

(10) Patent No.: US 11,688,921 B1
(45) Date of Patent: Jun. 27, 2023

(54) SATELLITE-COMMUNICATIONS GATEWAY

(71) Applicant: Hughes Network Systems, LLC, Germantown, MD (US)

(72) Inventor: Michael Scott, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 17/562,581

(22) Filed: Dec. 27, 2021

(51) Int. Cl.
*H01Q 1/12* (2006.01)
*H01Q 1/02* (2006.01)
*H01Q 1/42* (2006.01)
*H04B 1/036* (2006.01)
*H04B 1/04* (2006.01)
*H01Q 3/08* (2006.01)

(52) U.S. Cl.
CPC .............. *H01Q 1/02* (2013.01); *H01Q 1/125* (2013.01); *H01Q 1/428* (2013.01); *H01Q 3/08* (2013.01); *H04B 1/036* (2013.01); *H04B 1/04* (2013.01); *H04B 2001/0408* (2013.01); *H04B 2001/0491* (2013.01)

(58) Field of Classification Search
CPC .......... H01Q 1/02; H01Q 1/125; H01Q 1/428; H01Q 3/08; H04B 1/036; H04B 1/04; H04B 2001/0408
See application file for complete search history.

(56) References Cited

U.S. PATENT DOCUMENTS

| | | | |
|---|---|---|---|
| 6,272,340 B1 * | 8/2001 | Wright | H04B 7/18513 455/12.1 |
| 2001/0002821 A1 * | 6/2001 | Katou | H01Q 1/28 342/352 |
| 2004/0227683 A1 * | 11/2004 | Caimi | H01Q 9/40 343/742 |
| 2011/0291878 A1 * | 12/2011 | Mclaughlin | H01Q 19/134 343/766 |
| 2014/0009328 A1 * | 1/2014 | Knight | G01S 13/951 343/762 |
| 2014/0009329 A1 | 1/2014 | Knight et al. | |

(Continued)

FOREIGN PATENT DOCUMENTS

KR         100425987       *    4/2004

OTHER PUBLICATIONS

International Search Report and Written Opinion dated Mar. 17, 2023 for PCT/US2022/051307 (16 pages).

(Continued)

*Primary Examiner* — Awat M Salih
(74) *Attorney, Agent, or Firm* — Bejin Bieneman PLC

(57) ABSTRACT

A satellite-communications gateway includes a pedestal, a hub movably coupled to the pedestal and supported by the pedestal, an antenna configured for satellite communications, first electronics positioned inside the hub, and second electronics communicatively coupled to the first electronics and positioned inside the pedestal. The antenna is mounted to the hub and supported by the pedestal via the hub. The first electronics is arranged to convert a radio-frequency signal from the antenna to an intermediate-frequency signal and transmit the intermediate-frequency signal to the second electronics. The second electronics is arranged to convert the intermediate-frequency signal to a digital signal.

20 Claims, 7 Drawing Sheets

(56) References Cited

U.S. PATENT DOCUMENTS

2014/0057576 A1* 2/2014 Monte .................... H01Q 1/125
343/762

OTHER PUBLICATIONS

Koudelka O et al: "Design of a 40/50GHz satellite ground station for fade mitigation experiments", ACTA Astronautica, Pergamon Press, Elmsford, GB, vol. 86, Feb. 5, 2013 (Feb. 5, 2013), pp. 68-76, XP028999872, ISSN: 0094-5765, DOI: 10.1016/J.ACTAASTRO. 2012.10.001.
Vassallo, Enrico et al.: "The European Space Agency's Deep-Space Antennas", Proceedings of the IEEE, IEEE. New York, US, vol. 95, No. 11, Nov. 1, 2007 (Nov. 1, 2007), pp. 2111-2131, XP011197951, ISSN: 0018-9219, DOI: 10.1109/JPROC.2007.905189.
Pratt T et al: "Satellite Communications, Earth Station Technology", Jan. 1, 1986 (Jan. 1, 1986), Satellite Communications, New York, Wiley & Sons, US, pp. 404-412, XP002248387.

* cited by examiner

SATELLITE-COMMUNICATIONS GATEWAY

BACKGROUND

A satellite-communications gateway includes an antenna structure for receiving and sending transmissions to satellites. Types of satellites includes fixed-service satellites and high-throughput satellites. High-throughput satellites communicate using multiple spot beams on the order of hundreds of miles across, aimed at different regions of the earth's surface. A gateway located in the spot beam is able to communicate with the satellite.

DETAILED DESCRIPTION

Figure 1:
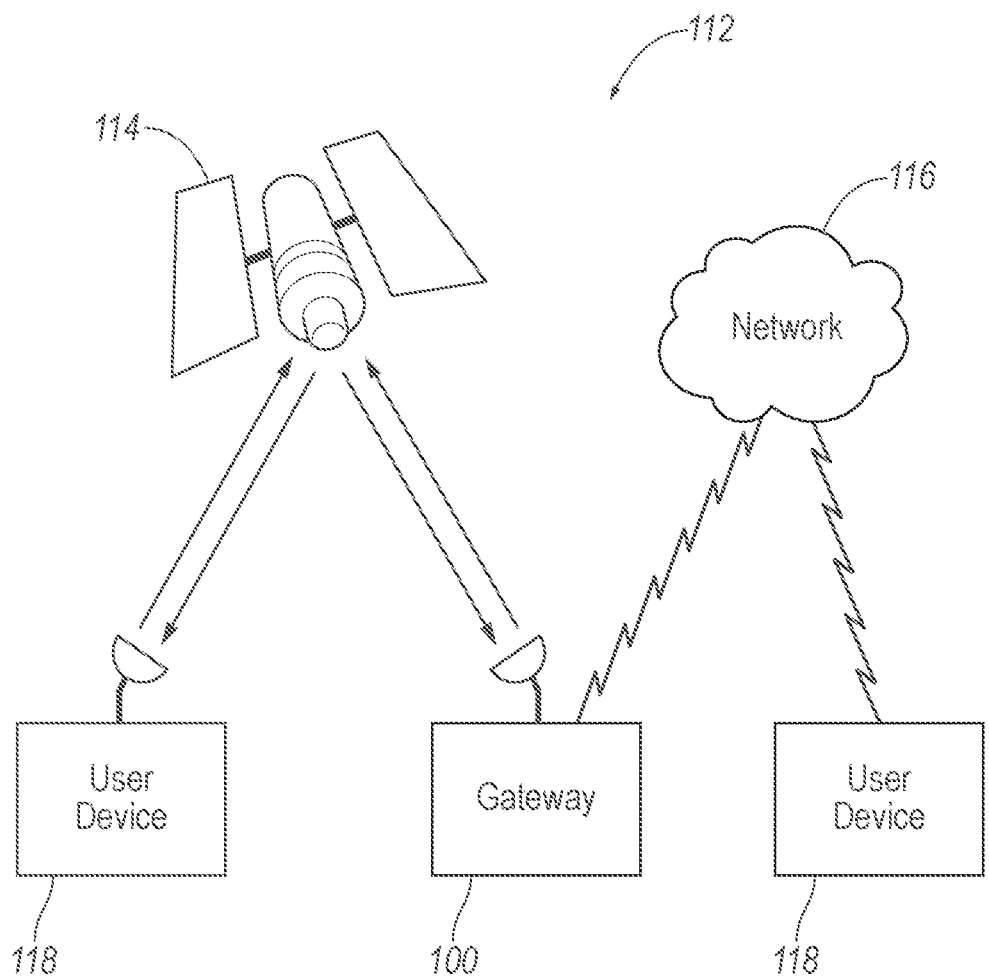
FIG. 1 is a diagram of a satellite-communications system.

A satellite-communications gateway includes a pedestal, a hub movably coupled to the pedestal and supported by the pedestal, an antenna configured for satellite communications, first electronics positioned inside the hub, and second electronics communicatively coupled to the first electronics and positioned inside the pedestal. The antenna is mounted to the hub and supported by the pedestal via the hub. The first electronics is arranged to convert a radio-frequency signal from the antenna to an intermediate-frequency signal and transmit the intermediate-frequency signal to the second electronics. The second electronics is arranged to convert the intermediate-frequency signal to a digital signal.

The satellite-communications gateway may further include an actuator assembly movably coupling the hub to the pedestal. The actuator assembly may have two rotational degrees of freedom.

The pedestal may define a vertical axis, and the actuator assembly may include an azimuth bearing assembly that is actuatable to rotate the hub and the antenna about the axis relative to the pedestal.

The actuator assembly may include an elevation jack that is actuatable to tilt the hub and the antenna about a horizontal axis relative to the pedestal. The actuator assembly may include an azimuth bearing assembly, the elevation jack may be mounted to the azimuth bearing assembly, and the azimuth bearing assembly may be actuatable to rotate the hub, the antenna, and the elevation jack about the axis relative to the pedestal.

The antenna may include a parabolic dish having a diameter in a range of 9 to 13 meters.

The first electronics may include a traveling-wave tube amplifier, and the traveling-wave tube amplifier may be sized to receive microwave frequencies on the V band. The traveling-wave tube amplifier may be a first traveling-wave tube amplifier, the first electronics may include a second traveling-wave tube amplifier, and the second traveling-wave tube amplifier may be sized to receive microwave frequencies on the Ka band.

The pedestal may be fixedly mounted to the ground.

The satellite-communications gateway may further include a first cooling unit positioned inside the hub, and a second cooling unit positioned inside the pedestal. The satellite-communications gateway may further include a piping network arranged to supply cooling medium to the first cooling unit and the second cooling unit, and the piping network may extend through the pedestal to the hub. The satellite-communications gateway may further include a chiller spaced from the pedestal and connected to the piping network to cool the cooling medium being transported to the first and second cooling units.

The cooling medium may be a mixture of water and glycol.

The satellite-communications gateway may further include a buffer tank spaced from the pedestal and connected to the piping network to store the cooling medium being transported to the first and second cooling units.

The first electronics may include a traveling-wave tube amplifier, and the traveling-wave tube amplifier may be liquid-cooled via the piping network. The traveling-wave tube amplifier may be a first traveling-wave tube amplifier, the first electronics may include a second traveling-wave tube amplifier, the second traveling-wave tube amplifier may be liquid-cooled via the piping network, the first traveling-wave tube amplifier may be sized to receive microwave frequencies on the V band, and the second traveling-wave tube amplifier may be sized to receive microwave frequencies on the Ka band.

The satellite-communications gateway may further include a heat exchanger and a secondary loop, the secondary loop may be positioned to circulate a second cooling medium, the heat exchanger may be positioned to exchange heat between the piping network and the secondary loop, and the traveling-wave tube amplifier may be liquid-cooled with the second cooling medium received from the secondary loop.

The first cooling unit may include a first heat exchanger and a first fan positioned to blow over the first heat exchanger, and the second cooling unit may include a second heat exchanger and a second fan positioned to blow over the second heat exchanger.

The satellite-communications gateway may further include a plurality of first cooling units including the first cooling unit and a plurality of second cooling units including the second cooling unit, the first cooling units may be positioned inside the hub, and the second cooling units may be positioned inside the pedestal.

With reference to the Figures, wherein like numerals indicate like parts throughout the several views, a satellite-communications gateway 100 includes a pedestal 102, a hub 104 movably coupled to the pedestal 102 and supported by the pedestal 102, an antenna 106 configured for satellite communications, first electronics 108 positioned inside the hub 104, and second electronics 110 communicatively coupled to the first electronics 108 and positioned inside the pedestal 102. The antenna 106 is mounted to the hub 104 and supported by the pedestal 102 via the hub 104. The first electronics 108 is arranged to convert a radio-frequency (RF) signal from the antenna 106 to an intermediate-frequency (IF) signal and transmit the IF signal to the second electronics 110. The second electronics 110 is arranged to convert the IF signal to a digital signal.

Electronics for converting the IF signal to the digital signal, herein referred to the second electronics 110, is traditionally located in a separate building spaced from the pedestal 102. By locating the second electronics 110 inside the pedestal 102, the gateway 100 can reduce interference with the IF signal by greatly reducing the distance that the IF signal must travel. Moreover, the location can reduce energy consumption because the electronics are located inside a smaller space that can be cooled more efficiently. Furthermore, the location can provide a more consistent design across gateways 100 compared with using a different, often preexisting building to house the second electronics 110 at each gateway 100.

With reference to FIG. 1, a satellite-communications system 112 can include one or more satellites 114, one or more gateways 100, a network 116, and one or more user devices 118.

The satellites 114 collectively form a constellation (i.e., a group) of network nodes whose position may change relative to one another, to the ground, or both. The satellites 114 include various circuits, chips, or other electronic components. For example, satellites 114 may be in low Earth orbit (LEO) in multiple planes and orbits relative to one another or in a geostationary orbit (GEO). The satellites 114 may be high-throughput satellites that communicate using spot beams.

The satellite-communications system 112 can include multiple gateways 100. Each gateway 100 may be a site for converting the microwave transmissions from the satellites 114 to digital signals that can be sent over the network 116. Each gateway 100 can include an antenna structure 120 for receiving and sending transmissions to the satellites 114, as will be described in more detail below.

The network 116 represents one or more mechanisms by which the gateways 100 may communicate with remote user devices 118. Accordingly, the network 116 may be one or more of various wired or wireless communication mechanisms, including any desired combination of wired (e.g., cable and fiber) and/or wireless (e.g., cellular, wireless, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The user devices 118 are computing devices such as desktop computers, laptop computers, mobile phones such as smartphones, and tablets. The user devices 118 are computing devices generally including a processor and a memory. The user devices 118 may receive and send data to the satellite 114 via the network 116 and the gateway 100, or the user device may be coupled to its own antenna for communicating directly with the satellite 114. The user device 118 may also include an antenna on a mobile platform such as an airplane or train that can send and receive data for devices of passengers on the mobile platform.

Figure 2:
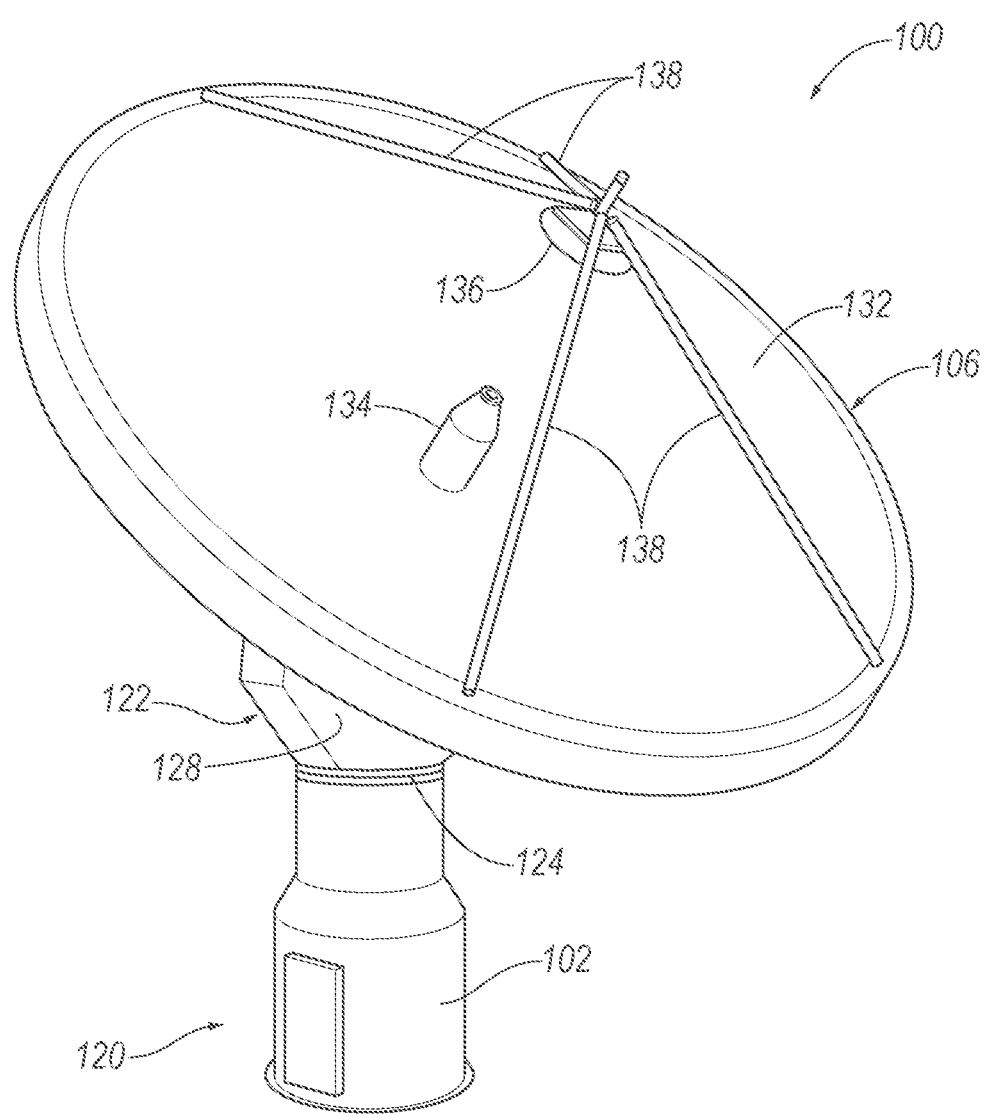
FIG. 2 is a perspective view of an antenna structure of the satellite-communications system at a gateway.
Figure 3:
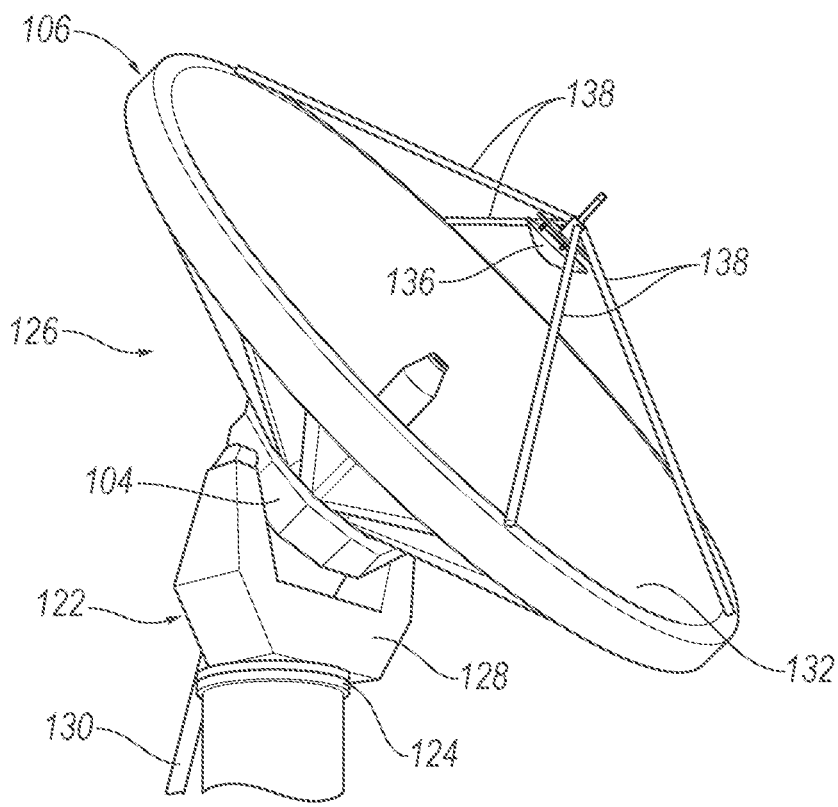
FIG. 3 is a perspective view of a portion of the antenna structure.
Figure 4:
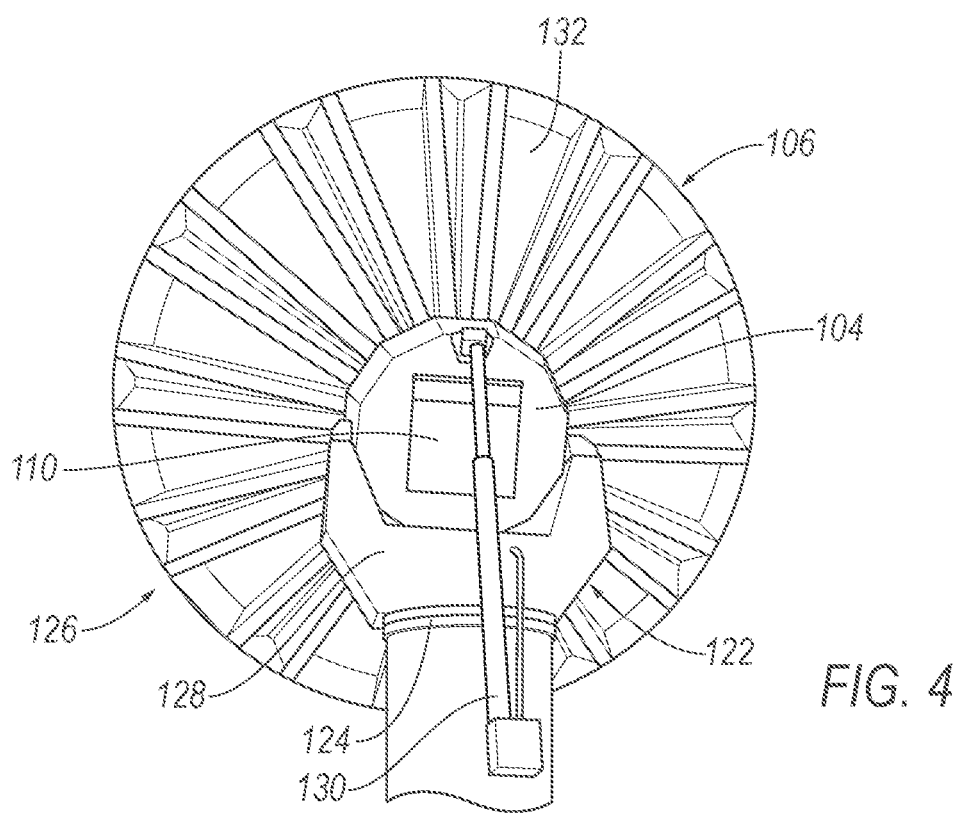
FIG. 4 is a rear perspective view of the portion of the antenna structure.

With reference to FIGS. 2-4, the gateway 100 includes the antenna structure 120. The antenna structure 120 can include the pedestal 102, an actuator assembly 122, the hub 104, the antenna 106, the first electronics 108, and the second electronics 110.

With reference to FIG. 2, the pedestal 102 can be fixedly mounted to the ground, e.g., anchored to a concrete platform on the ground. The pedestal 102 does not move relative to the ground. The pedestal 102 can support the other components of the antenna structure 120, e.g., the actuator assembly 122, the hub 104, and the antenna 106, and the other components of the antenna structure 120 can be held above the ground by the pedestal 102. The pedestal 102 can have a generally cylindrical shape that defines a vertical axis. The pedestal 102 can include one or more access doors for maintenance.

With reference to FIGS. 3-4, the actuator assembly 122 movably couples the hub 104 to the pedestal 102. The actuator assembly 122 can have two rotational degrees of freedom, e.g., about the vertical axis defined by the pedestal 102 and about a horizontal axis perpendicular to the vertical axis. In other words, the actuator assembly 122 can control the yaw and pitch of the antenna 106. The actuator assembly 122 can thereby aim the antenna 106 at any point in the sky.

The actuator assembly 122 can include an azimuth bearing assembly 124. The azimuth bearing assembly 124 is actuatable to rotate a top assembly 126 of the antenna structure 120 about the vertical axis relative to the pedestal 102. The top assembly 126 can include the hub 104, the antenna 106, a bracket 128 of the actuator assembly 122, and an elevation jack 130 of the actuator assembly 122. The azimuth bearing assembly 124 rotates the top assembly 126 as a unit, i.e., all together as a single body. The azimuth bearing assembly 124 can include, e.g., a bearing defining the vertical axis and a motor positioned to advance a point of the top assembly 126 along the bearing. The azimuth bearing assembly 124 can also include an encoder to monitor movement of the azimuth bearing assembly 124.

The actuator assembly 122 can include the bracket 128 and the elevation jack 130. The bracket 128 can be mounted on the azimuth bearing assembly 124. The bracket 128 can have a U-shape with two pivot points attached on the sides of the hub 104. The two pivot points can define the horizontal axis. The bracket 128 can be sized to accommodate the hub 104 inside the U-shape of the bracket 128 even when the hub 104 is aimed horizontally. The elevation jack 130 can be mounted to the azimuth bearing assembly 124. For example, the elevation jack 130 can be attached at a point on the bracket 128 and at a point on the hub 104. The elevation jack 130 can be, e.g., a piston that can be actuated to extend or compress. The extension and compression of the elevation jack 130 changes the distance between the attachment points on the hub 104 and the bracket 128, thereby tilting the hub 104 and the antenna 106 about the horizontal axis relative to the bracket 128. The elevation jack 130 can also include an encoder to monitor movement of the elevation jack 130.

The hub 104 is movably coupled to the pedestal 102 via the actuator assembly 122. The hub 104 can have a cylindrical shape or dodecahedral-prism shape defining an antenna axis passing through a geometric center of the shape. The antenna axis defines the direction in which the antenna 106 is aimed, e.g., at one of the satellites 114.

With reference to FIG. 3, the antenna 106 can be configured for satellite communications. For example, the antenna 106 can include a parabolic dish 132 and a feed antenna 134 positioned at the focus defined by the parabolic dish 132. When the antenna 106 is receiving, collimated radio waves, e.g., from a spot beam from one of the satellites 114, reflect off of the parabolic dish 132 and are focused to a point on the feed antenna 134. When the antenna 106 is transmitting, the feed antenna 134 converts a signal to radio waves, which reflect off of the parabolic dish 132 into a parallel beam toward the satellite 114. For another example, as shown in the Figures, the antenna 106 can have a Cassegrain configuration including the parabolic dish 132, the feed antenna 134, and a secondary reflector 136 positioned to reflect radio waves between the parabolic dish 132 and the feed antenna 134. In the Cassegrain configuration, the secondary reflector 136 can be convex toward the parabolic dish 132 and is centered on the antenna axis. In both examples, the parabolic dish 132 has a paraboloid shape centered on the antenna axis. The parabolic dish 132 can be sized for satellite communications, e.g., can have a diameter in a range of 9 to 13 meters. The feed antenna 134 can be centered on the antenna axis.

The antenna 106 can be mounted to the hub 104 and supported by the pedestal 102 via the hub 104. For example, the parabolic dish 132 can be formed of panels that are mounted to the hub 104 and to each other in series around the antenna axis. The secondary reflector 136 can be fixed relative to the parabolic dish 132 by legs 138. The feed antenna 134 can be mounted to the hub 104 at a center of the hub 104. The antenna 106 is fixed relative to the hub 104 and moves with the hub 104 as a rigid body.

Figure 5:
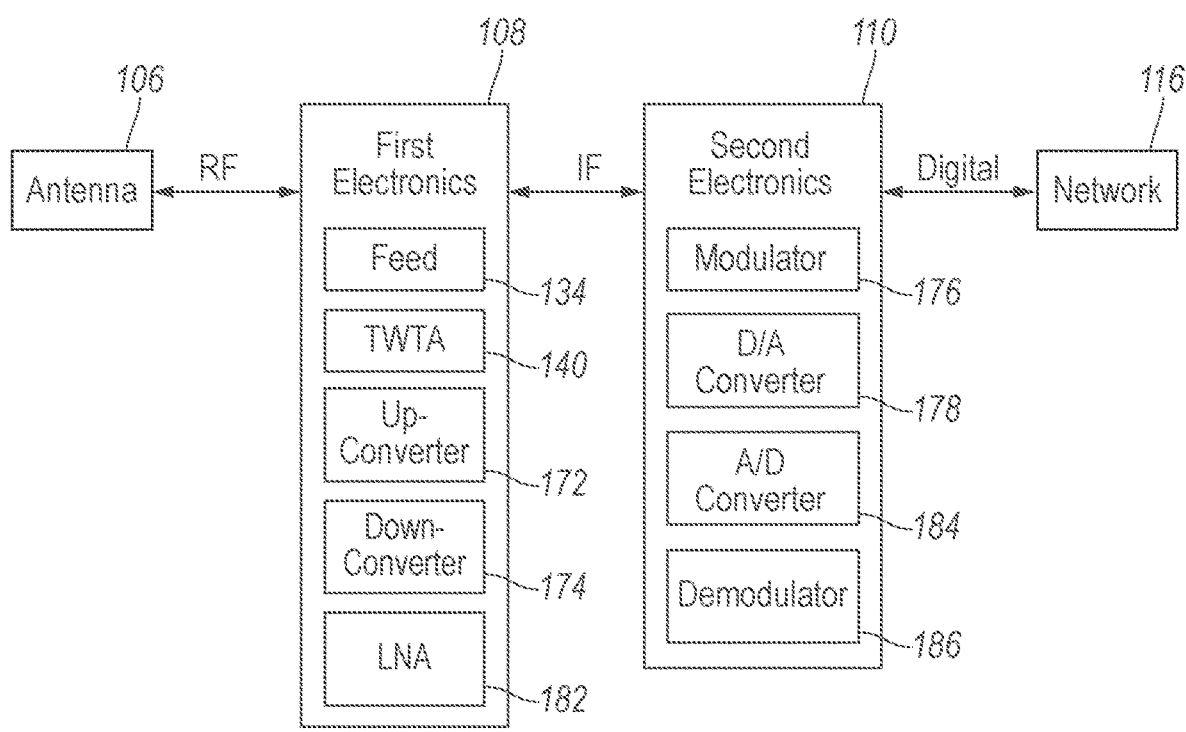
FIG. 5 is a block diagram of electronics of the antenna structure.

With reference to FIG. 5, the first electronics 108 is arranged to convert the RF signal from the antenna 106, specifically from the feed antenna 134, to the IF signal and to transmit the IF signal to the second electronics 110, and vice versa. For the purposes of this disclosure, "electronics" is defined as one or more devices using transistors, microchips, and/or electrical circuits. For example, the first electronics 108 can include a plurality of traveling-wave tube amplifiers 140. The traveling-wave tube amplifiers 140 amplify the RF signals being sent or received through the feed antenna 134. The traveling-wave tube amplifiers 140 can be sized or adjusted to receive the RF signal as microwave frequencies, e.g., in the Ka band (26.5-40 GHz), V band (40-75 GHz), and/or the Q band, which overlaps the Ka and V bands (36-46 GHz). The traveling-wave tube amplifiers 140 can be sized or adjusted to receive the RF signals in different frequencies, e.g., one or more first traveling-wave tube amplifiers 140a sized for the V band and one or more second traveling-wave tube amplifiers 140b sized for the Ka band. The first electronics 108 can further include an up-converter 172 to convert the IF signal from the second electronics 110 for transmission into an RF signal that is supplied to the traveling-wave tube amplifiers 140. The first electronics 108 can further include a down-converter 174 to convert the RF signal from the traveling-wave tube amplifiers 140 to the IF signal to supply to the second electronics 110. The first electronics 108 can further include low-noise amplifiers 182 and other devices.

The second electronics 110 is communicatively coupled to the first electronics 108. The second electronics 110 can thereby transmit IF signals to and receive IF signals from the first electronics 108. The second electronics 110 is arranged to convert the digital signal to an IF signal to facilitate transmission. For example, the second electronics 110 can include a modulator 176 for modulation of the IF signal and a digital-to-analog converter 178. The second electronics 110 is also arranged to convert the IF signal to the digital signal to support reception. For example, the second electronics 110 can include an analog-to-digital converter 184 and a demodulator 186 for demodulation of the IF signal. The second electronics 110 is communicatively coupled to the network 116. The second electronics 110 can thereby transmit digital signals to and receive digital signals from the network 116.

Returning to FIG. 4, the first electronics 108 can be positioned inside the hub 104. The first electronics 108 can be fixed relative to the hub 104 and move with the hub 104 and the antenna 106 as a rigid body. The hub 104 can shield the first electronics 108 from the environment. The various components of the first electronics 108 can generate heat within the hub 104. As will be described below, the hub 104 can contain a climate-controlled zone for the first electronics 108 so that the first electronics 108 can operate properly for a wide range of weather conditions at the gateway 100.

Figure 6:
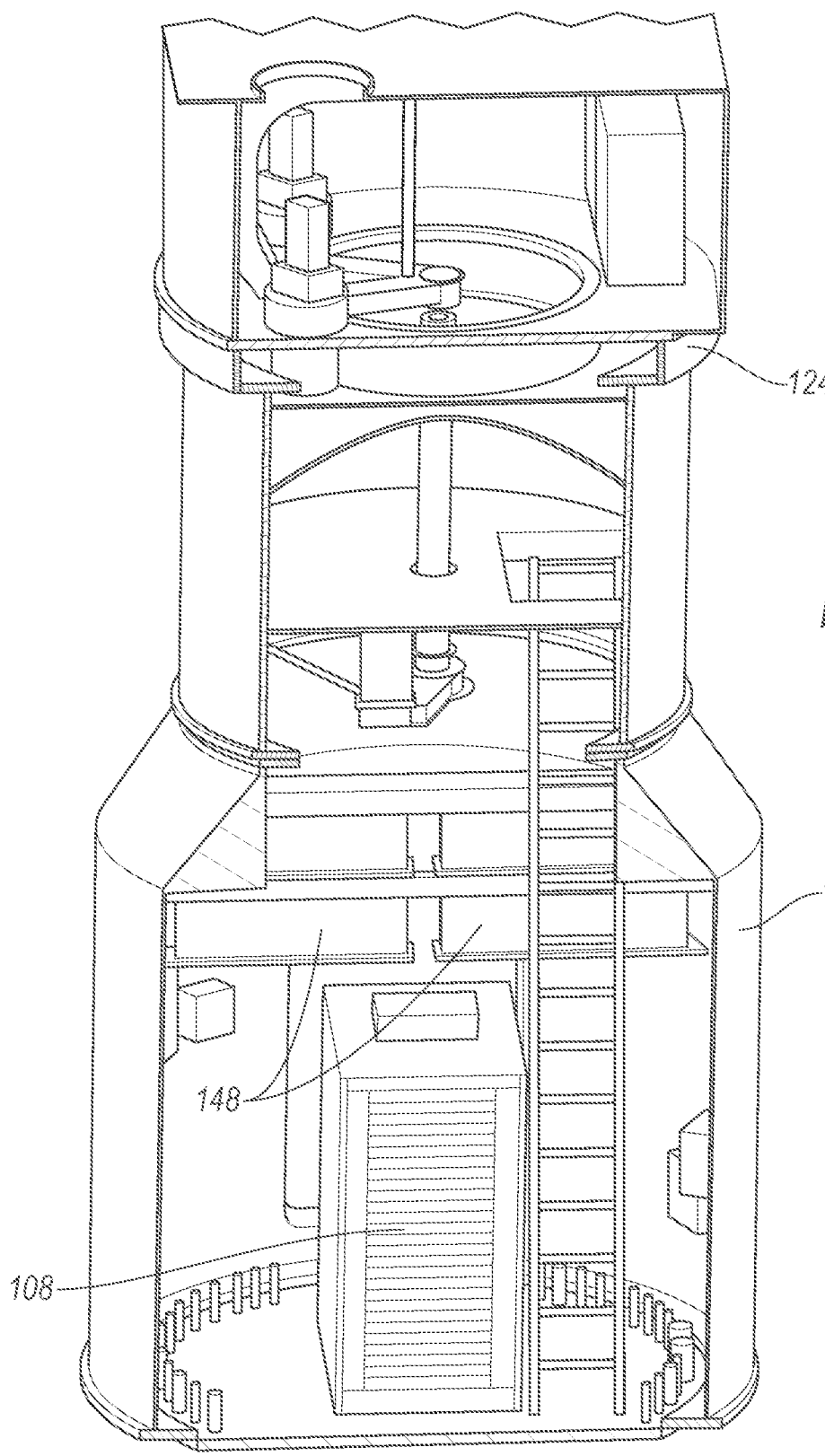
FIG. 6 is a perspective cutaway view of a portion of the antenna structure.

With reference to FIG. 6, the second electronics 110 is positioned inside the pedestal 102. The second electronics 110 can be fixed relative to the pedestal 102 and fixed relative to the ground. The pedestal 102 can shield the second electronics 110 from the environment. The various components of the second electronics 110 can generate heat within the pedestal 102. As will be described below, the pedestal 102 can contain a climate-controlled zone for the second electronics 110 so that the second electronics 110 can operate properly for a wide range of weather conditions at the gateway 100.

Figure 7:
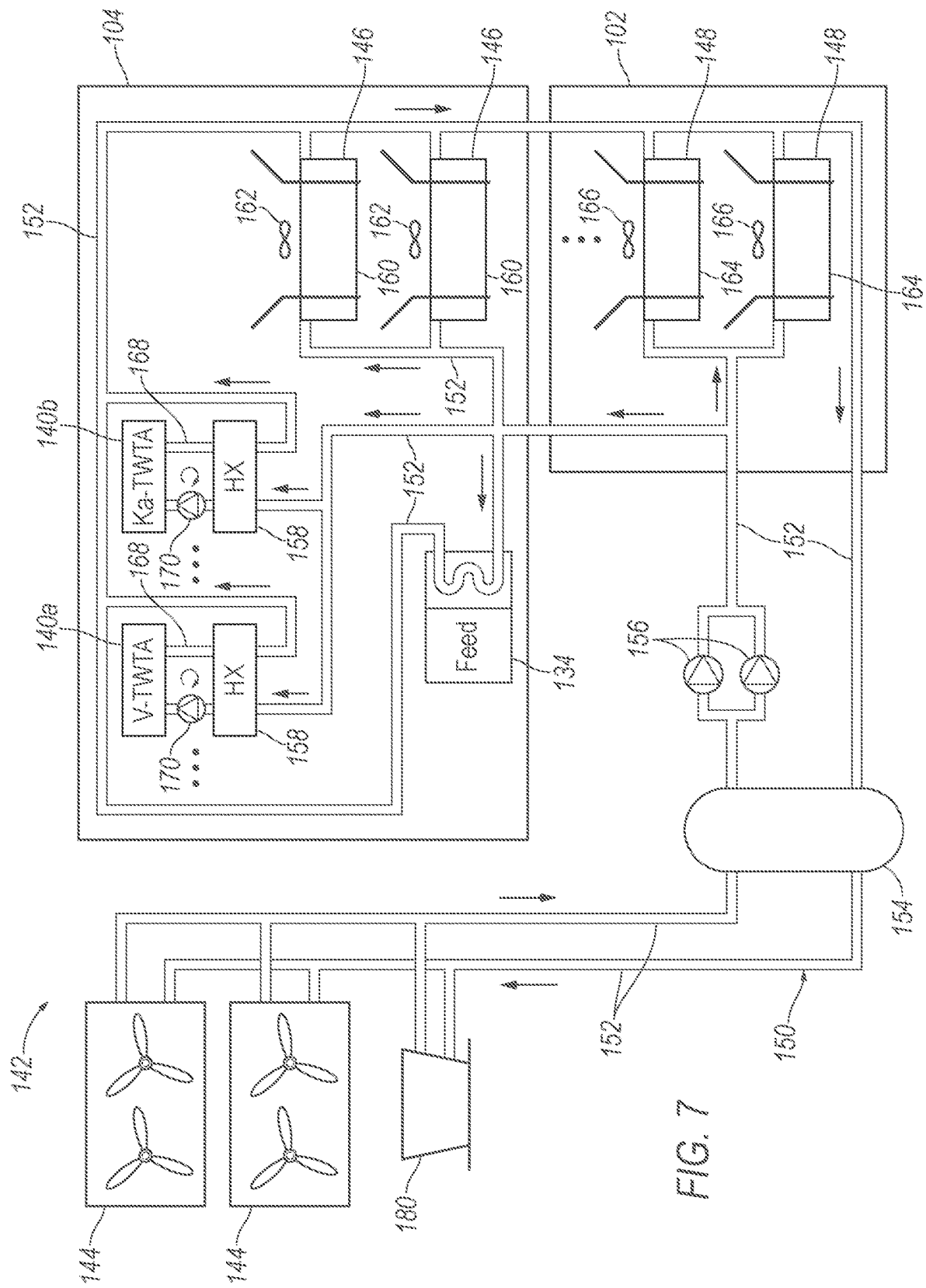
FIG. 7 is a piping diagram of a cooling system at the gateway for the antenna structure.
Figure 8:
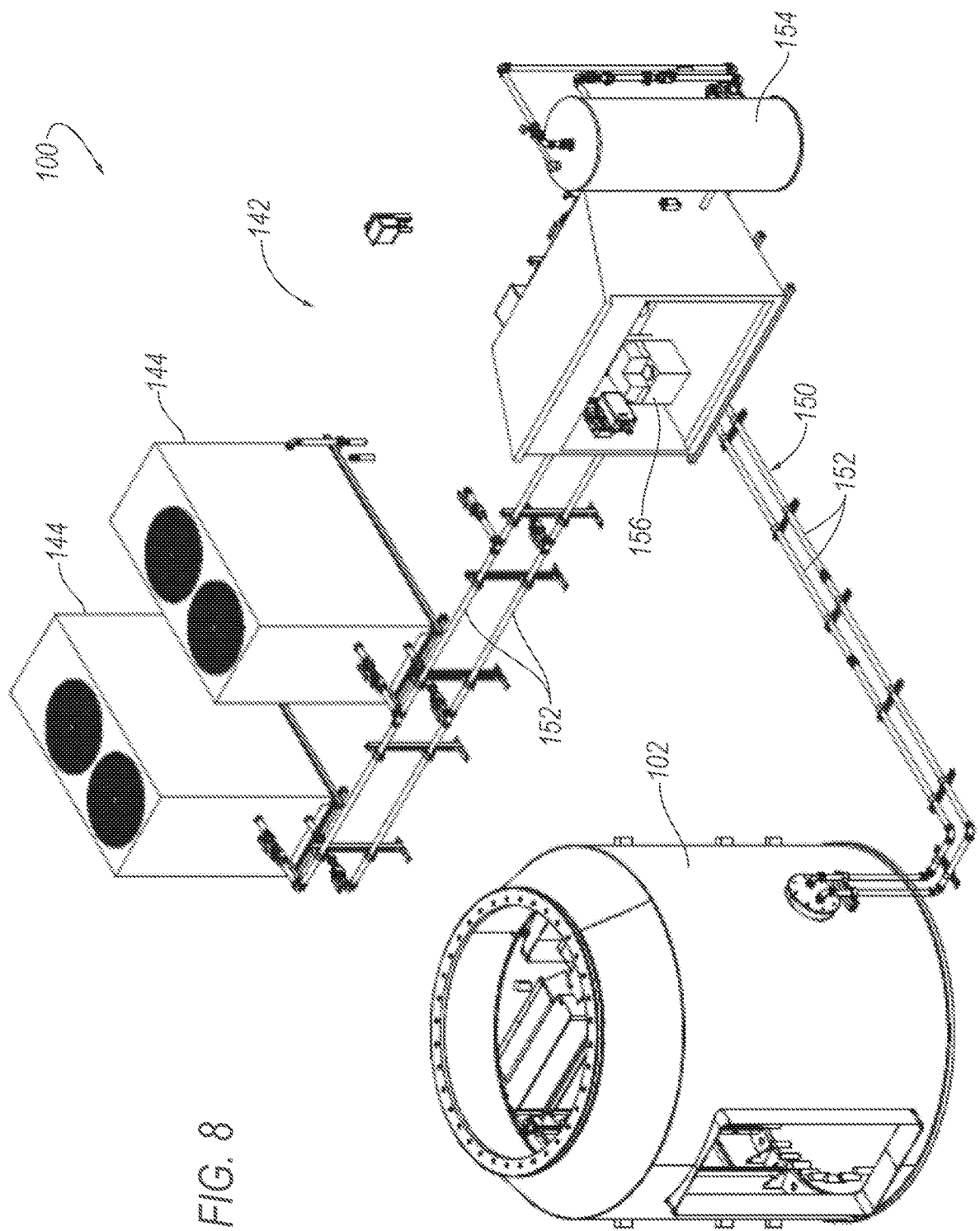
FIG. 8 is a perspective view of components of the cooling system.

With reference to FIGS. 7 and 8, the gateway 100 can include a cooling system 142 for controlling temperatures experienced by the first electronics 108 and the second electronics 110. The cooling system 142 can include at least one chiller 144, at least one first cooling unit 146 for the first electronics 108, at least one second cooling unit 148 for the second electronics 110, and a piping network 150 to transport a cooling medium from the at least one chiller 144 to the cooling units 146, 148. The cooling medium can be a mixture of water and glycol. The ratio of water to glycol can be chosen based on a temperature range of local weather at the gateway 100.

The cooling system 142 includes at least one chiller 144, e.g., two chillers 144 as shown in the Figures. The number of chillers 144 can be chosen based on a cooling load of the antenna structure 120. Using multiple chillers 144 can provide redundancy in case of a failure in one of the chillers 144. The chillers 144 can be any suitable type for removing heat from the cooling medium, e.g., vapor-compression, adsorption refrigeration, absorption refrigeration, etc. The chillers 144 can be spaced from the pedestal 102, which can keep exhaust heat away from the antenna structure 120. The chillers 144 can be arranged in parallel in the piping network 150. The cooling system 142 may include a dry cooler 180 spaced from the pedestal 102 and arranged in parallel in the piping network 150. The dry cooler 180 can remove heat from the cooling medium even at very low ambient temperatures at which the chillers 144 are less effective.

The piping network 150 can include a plurality of pipes 152 arranged to supply the cooling medium from the chillers 144 to the first cooling units 146 and the second cooling units 148. The pipes 152 can be insulated. The pipes 152 can be arranged in a loop, in the order that the cooling medium flows, from the chillers 144 to a buffer tank 154; then to one or more pumps 156; then to the first cooling units 146, the second cooling units 148, third heat exchangers 158 for the traveling-wave tube amplifiers 140, and the feed antenna 134; then back to the buffer tank 154; and then back to the chillers 144. The pipes 152 extend from the pumps 156 into the pedestal 102 and branch to the first cooling units 146 and through the pedestal 102 to the hub 104. The pipes 152 returning from the hub 104 extend through the pedestal 102 and join with the pipes 152 from the first cooling units 146, and the pipes 152 extend from the pedestal 102 back to the buffer tank 154.

The buffer tank 154 can be a storage tank for the cooling medium. The buffer tank 154 can be connected to the piping network 150 to store the cooling medium being transported from the chillers 144 to the first and second cooling units 146, 148, i.e., to store the cooling medium on a cold side of the cooling system 142. The buffer tank 154 can permit the cooling system 142 to handle peak cooling loads that exceed a capacity of the chillers 144 alone.

The pumps 156 can force the cooling medium through the piping network 150 with sufficient pressure to travel from the chillers 144 to the first cooling units 146 and second cooling units 148 and back. The pumps 156 can be any suitable type for moving the cooling medium, e.g., positive-displacement, centrifugal, axial-flow, etc. The pumps 156 can be connected to the piping network 150 between the buffer tank 154 and the pedestal 102, i.e., on the cold side of the cooling system 142.

With reference to FIGS. 6 and 7, the second cooling units 148 are positioned inside the pedestal 102. For example, the second cooling units 148 can be suspended in the pedestal 102 above the second electronics 110, as shown in FIG. 6. Each second cooling unit 148 can include a second heat exchanger 160 and a second fan 162 positioned to blow over the second heat exchanger 160. The second heat exchanger 160 absorbs heat from the air inside the pedestal 102 to the cooling medium, and the second fan 162 increases a rate of heat transfer by providing airflow over the second heat exchanger 160. The second heat exchanger 160 can be any suitable type for absorbing heat from air to the cooling medium, e.g., a finned tube heat exchanger.

With reference to FIG. 7, the first cooling units 146 are positioned inside the hub 104. The first cooling units 146 can be positioned in a same space with the first electronics 108. Each first cooling unit 146 can include a first heat exchanger 164 and a first fan 166 positioned to blow over the first heat exchanger 164. The first heat exchanger 164 absorbs heat from the air inside the hub 104 to the cooling medium, and the first fan 166 increases a rate of heat transfer by providing airflow over the first heat exchanger 164. The first heat exchanger 164 can be any suitable type for absorbing heat from air to the cooling medium, e.g., a finned tube heat exchanger.

The traveling-wave tube amplifiers 140 can be liquid-cooled via the piping network 150. For example, the cooling system 142 can include, for each traveling-wave tube amplifier 140, the third heat exchanger 158 and a secondary loop 168. The secondary loop 168 can be positioned to circulate a second cooling medium through the respective traveling-wave tube amplifier 140. The secondary loop 168 can include a secondary pump 170 positioned to circulate the second cooling medium. The third heat exchanger 158 can be positioned to exchange heat between the piping network 150 and the secondary loop 168. The third heat exchanger 158 can be any suitable type of liquid-liquid heat exchanger.

The feed antenna 134 can be liquid-cooled via the piping network 150. For example, the feed antenna 134 can be directly connected to the piping network 150, and the cooling medium can pass through the structure of the feed antenna 134. Components of the feed antenna 134 that generate heat can be thermally coupled with the piping network 150, i.e., attached such that heat may efficiently flow and both ends of the thermal coupling (if separate) are substantially the same temperature within a short time period.

The disclosure has been described in an illustrative manner, and it is to be understood that the terminology which has been used is intended to be in the nature of words of description rather than of limitation. The adjectives "first," "second," and "third" are used throughout this document as identifiers and are not intended to signify importance, order, or quantity. Many modifications and variations of the present disclosure are possible in light of the above teachings, and the disclosure may be practiced otherwise than as specifically described.

What is claimed is:

1. A satellite-communications gateway comprising:
   a columnar pedestal elongated vertically and mountable to the ground;
   a hub movably coupled to the pedestal and supported by the pedestal;
   an antenna configured for satellite communications, the antenna being mounted to the hub and supported by the pedestal via the hub, the hub being fixed relative to the antenna;
   RF-to-IF electronics arranged to convert a radio-frequency signal from the antenna to an intermediate-frequency signal and positioned inside the hub; and
   IF-to-digital electronics arranged to convert the intermediate-frequency signal from the RF-to-IF electronics to a digital signal, communicatively coupled to the RF-to-IF electronics and positioned inside the pedestal.

2. The satellite-communications gateway of claim 1, further comprising an actuator assembly movably coupling the hub to the pedestal.

3. The satellite-communications gateway of claim 2, wherein the actuator assembly has two rotational degrees of freedom.

4. The satellite-communications gateway of claim 2, wherein the pedestal defines a vertical axis, and the actuator assembly includes an azimuth bearing assembly that is actuatable to rotate the hub and the antenna about the axis relative to the pedestal.

5. The satellite-communications gateway of claim 2, wherein the actuator assembly includes an elevation jack that is actuatable to tilt the hub and the antenna about a horizontal axis relative to the pedestal.

6. The satellite-communications gateway of claim 5, wherein the actuator assembly includes an azimuth bearing assembly, the elevation jack is mounted to the azimuth bearing assembly, and the azimuth bearing assembly is actuatable to rotate the hub, the antenna, and the elevation jack about the axis relative to the pedestal.

7. The satellite-communications gateway of claim 1, wherein the antenna includes a parabolic dish having a diameter in a range of 9 to 13 meters.

8. The satellite-communications gateway of claim 1, wherein the RF-to-IF electronics includes a traveling-wave tube amplifier, and the traveling-wave tube amplifier is sized to receive microwave frequencies on the V band.

9. The satellite-communications gateway of claim 8, wherein the traveling-wave tube amplifier is a first traveling-wave tube amplifier, the RF-to-IF electronics includes a second traveling-wave tube amplifier, and the second traveling-wave tube amplifier is sized to receive microwave frequencies on the Ka band.

10. The satellite-communications gateway of claim 1, wherein the pedestal is fixedly mounted to the ground.

11. The satellite-communications gateway of claim 1, further comprising a first cooling unit positioned inside the hub, and a second cooling unit positioned inside the pedestal.

12. The satellite-communications gateway of claim 11, further comprising a piping network arranged to supply cooling medium to the first cooling unit and the second cooling unit, wherein the piping network extends through the pedestal to the hub.

13. The satellite-communications gateway of claim 12, further comprising a chiller spaced from the pedestal and connected to the piping network to cool the cooling medium being transported to the first and second cooling units.

14. The satellite-communications gateway of claim 12, wherein the cooling medium is a mixture of water and glycol.

15. The satellite-communications gateway of claim 12, further comprising a buffer tank spaced from the pedestal and connected to the piping network to store the cooling medium being transported to the first and second cooling units.

16. The satellite-communications gateway of claim 12, wherein the RF-to-IF electronics includes a traveling-wave tube amplifier, and the traveling-wave tube amplifier is liquid-cooled via the piping network.

17. The satellite-communications gateway of claim 16, wherein the traveling-wave tube amplifier is a first traveling-wave tube amplifier, the RF-to-IF electronics includes a second traveling-wave tube amplifier, the second traveling-wave tube amplifier is liquid-cooled via the piping network, the first traveling-wave tube amplifier is sized to receive microwave frequencies on the V band, and the second traveling-wave tube amplifier is sized to receive microwave frequencies on the Ka band.

18. The satellite-communications gateway of claim 16, further comprising a heat exchanger and a secondary loop, wherein the secondary loop is positioned to circulate a second cooling medium, the heat exchanger is positioned to exchange heat between the piping network and the secondary loop, and the traveling-wave tube amplifier is liquid-cooled with the second cooling medium received from the secondary loop.

19. The satellite-communications gateway of claim 11, wherein the first cooling unit includes a first heat exchanger and a first fan positioned to blow over the first heat exchanger, and the second cooling unit includes a second heat exchanger and a second fan positioned to blow over the second heat exchanger.

20. The satellite-communications gateway of claim 11, further comprising a plurality of first cooling units including the first cooling unit, and a plurality of second cooling units including the second cooling unit, wherein the first cooling units are positioned inside the hub, and the second cooling units are positioned inside the pedestal.

\* \* \* \* \*